United States Patent
Barbash et al.

(10) Patent No.: US 6,826,595 B1
(45) Date of Patent: Nov. 30, 2004

(54) INTERNET COLLABORATION SYSTEM AND METHOD

(75) Inventors: Joshua Barbash, Tel-Aviv (IL); Amichay Oren, Rosh Haa'in (IL); Yael Oren, Rosh Haa'in (IL); Mordechai Gust, Hadera (IL)

(73) Assignee: SAP Portals Israel, Ltd., Raanana (IL)

( * ) Notice: Subject to any disclaimer, the term of this patent is extended or adjusted under 35 U.S.C. 154(b) by 850 days.

(21) Appl. No.: 09/610,666

(22) Filed: Jul. 5, 2000

(51) Int. Cl.$^7$ ............................................. G06F 15/16
(52) U.S. Cl. ...................... 709/204; 709/227; 715/512
(58) Field of Search ............................... 709/204, 205, 709/227, 246, 203; 715/512, 513, 515; 345/753, 759, 691, 733

(56) References Cited

U.S. PATENT DOCUMENTS

| | | | | |
|---|---|---|---|---|
| 5,502,727 A | * | 3/1996 | Catanzaro et al. | 370/271 |
| 5,600,775 A | * | 2/1997 | King et al. | 715/500 |
| 5,822,539 A | * | 10/1998 | van Hoff | 709/236 |
| 5,920,694 A | * | 7/1999 | Carleton et al. | 709/205 |
| 6,081,829 A | * | 6/2000 | Sidana | 709/203 |
| 6,240,444 B1 | | 5/2001 | Fin et al. | |
| 6,546,405 B2 | * | 4/2003 | Gupta et al. | 715/512 |
| 6,584,479 B2 | * | 6/2003 | Chang et al. | 715/512 |

FOREIGN PATENT DOCUMENTS

| | | |
|---|---|---|
| EP | 0 550 370 A2 | 7/1993 |
| EP | 0 883 260 | 12/1998 |

OTHER PUBLICATIONS

Frivold, et al., "Extending WWW for synchronous collaboration", *Computer Networks and ISDN Systems*, vol. 28, pp. 69–75, 1995.
Roberts, "Groupwar Strategies", *Byte*, pp. 68–75, Jul. 1996.
Peters, et al., "CrystalWeb—A distributed authoring environment for the world–Wide Web", *Computer Networks and ISDN Systems*, vol. 27, pp. 861–870, 1995.
Roscheisen, et al., "Beyond browsing: shared comnents, SOAPs, trails, and on–line communities", *Computer Networks and ISDN systems*, vol. 27, pp. 739–749, 1995.

* cited by examiner

Primary Examiner—Mehmet B. Geckil
(74) Attorney, Agent, or Firm—Fish & Richardson P.C.

(57) ABSTRACT

Thus provided according to one aspect of the invention is a method of communication by the Internet network between at least a first GROUP member and a second GROUP member, each connectable to one or more SERVERS having data-bases, and employing an interface for displaying web-page(s), comprising the steps of establishing connection by the first GROUP member to a SERVER, establishing connection by the second GROUP member, to the SERVER, updating the first and the second GROUP members of being respectively connected to the SERVER, loading an original web-page by the first GROUP member, updating the second GROUP member of the location of the web-page; and loading the original web-page by the second GROUP member. The method may comprise the further steps of creation of an annotation by the first GROUP member overlying the web-page, loading the annotation by the second GROUP member and establishing creation of an annotation by the second GROUP member overlaying the web-page and loading the annotation by the first GROUP member.

50 Claims, 6 Drawing Sheets

INTERNET COLLABORATION SYSTEM AND METHOD

PRIORITY

This application claims the benefit of the filing date of Israeli Patent Application No. 130881 filed Jul. 11, 1999.

BACKGROUND OF THE INVENTION

The present invention generally relates to Internet collaboration between two or more Users.

Ordinary Internet collaboration includes either of the following:

1. Exchanging data information, including text or graphics, via email service.

2. Exchanging text data in real time using "chat" application.

3. Whiteboard application for creating collaborative graphic documents.

Neither of the above-mentioned methods enables User B to view the original web-page annotated by User A, and vice-versa.

Furthermore, with regard to the same web-page, there is no way by which one user can follow, in real-time, graphical or textural annotations added to the web-page by any other user.

It is thus the prime object of the present invention to provide an Internet collaboration system which enables users to follow in real-time the web-page of any predefined group of users.

It is a further object of the invention to further enable any of the users to create annotations super imposed on a given web-page, which can be viewed by any other member of the group, or same user, in real time. Alternatively, members can send messages to inform other users of specific newly created annotations.

It is a still further object of the invention to enable users to select from the annotated web-page, using any chosen criteria, (e.g. time, author, annotation type etc.) any of the previously entered and stored annotations.

It is a still another object of the invention to follow-up members of the group's activities while surfing the web.

SUMMARY OF THE INVENTION

Thus provided according to one aspect of the invention is a method of communication by the Internet network between at least a first GROUP member and a second GROUP member, each connectable to one or more SERVERS having data-bases, and employing an interface for displaying web-page(s), comprising the steps of establishing connection by the first GROUP member to a SERVER, establishing connection by the second GROUP member, to the SERVER, updating the first and the second GROUP members of being respectively connected to the SERVER, loading an original web-page by the first GROUP member, updating the second GROUP member of the location of the web-page; and loading the original web-page by the second GROUP member. The method may comprise the further steps of creation of an annotation by the first GROUP member overlying the web-page, loading the annotation by the second GROUP member and establishing creation of an annotation by the second GROUP member overlaying web-page and loading the annotation by the first GROUP member.

BRIEF DESCRIPTION OF THE DRAWINGS

These and additional features of the invention will become more clearly understood in the light of the ensuing description of a preferred embodiment thereof given by way of example only, with reference to the accompanying drawings, wherein.

DETAILED DESCRIPTION

Figure 1A:
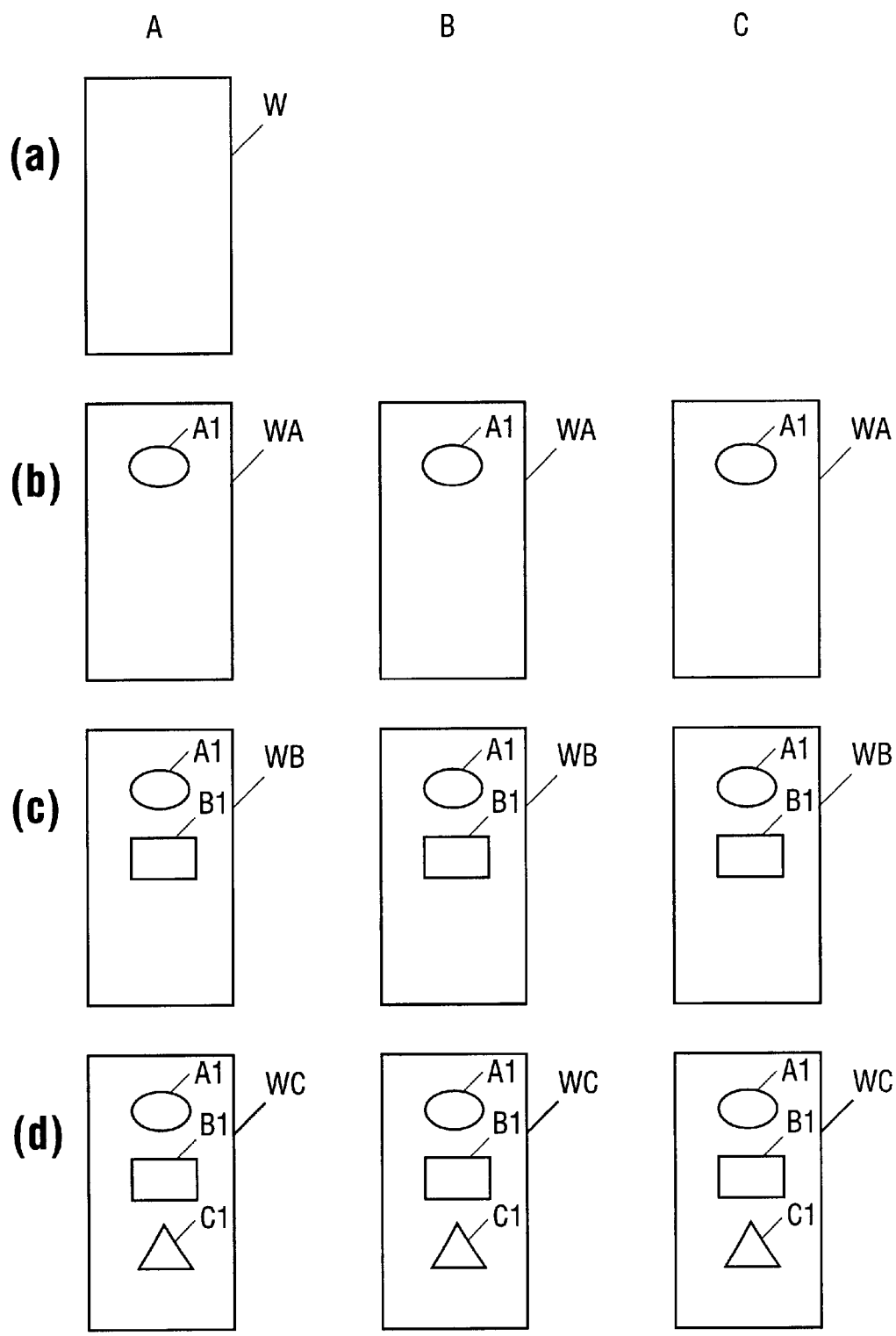
FIGS. 1a–1b illustrates a simple, conceptual example of the method proposed according to the present invention.
Figure 1B:
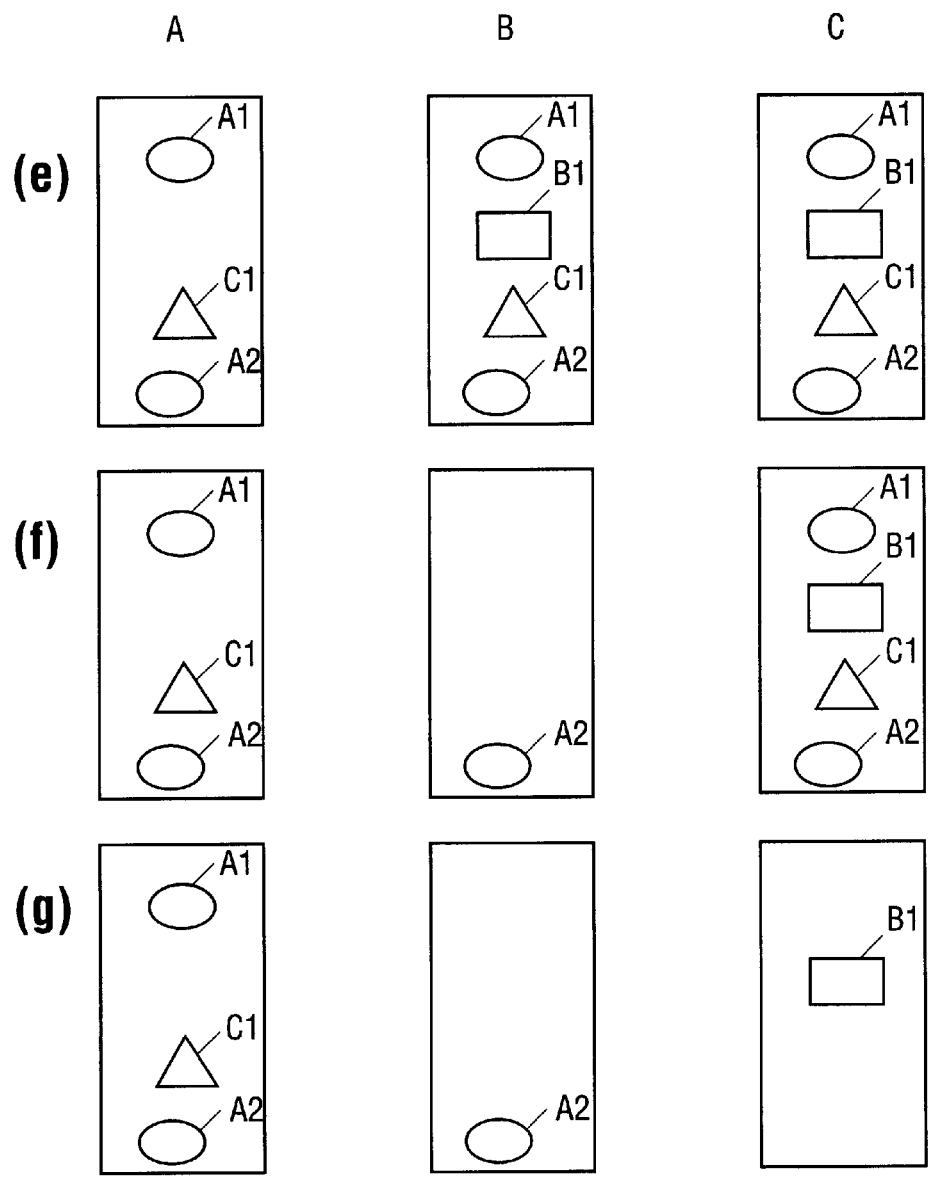

FIG. 1 exemplifies one embodiment of the collaboration method herein proposed. For the purpose of this example, it will be assumed that Internet users A, B and C ("the GROUP") have subscribed to the service offered by a designated "SERVER" as herein proposed (see below). In addition, it is assumed that member A of the GROUP views an original down-loaded web-page W—see stage (a).

User A adds an overlaid annotation A1 to the web-page W thus creating web-page WA. It is important to note that the original web-page remains unchanged and all annotations are added as overlays only. Members B and C have joined in viewing the same web-page W, using the CLIENT. Their screens show web-page WA which includes the annotation A1 created by A on the original web-page W—see stage (b).

Stage (c) represents the situation where member B added annotation B1 to WA, which is immediately reflected as WB on the screens of his GROUP members A and C.

Likewise (stage (d)), member C adds annotation C1, which is then shown to A and B as WC.

Now, member A wishes to view only the overlaid annotation previously added by C. He thus "peels off" the overlaid annotation of B (hereinafter referred to as "FILTERING by author"). The FILTERING operation is not reflected on the screens of B and C—see stage (e). In addition member A creates a second annotation $A^2$ which is immediately reflected on the screens of B and C.

In stage (f) there is illustrated a situation where B wishes to "peel off" all added annotations and view only the latest annotation A2 ("FILTERING by time").

Stage (g) shows that C views only the annotations of B.

These schematic examples are of course over-simplified and are just brought in order to illustrate the basic concept of the invention. In practice, the application of this concept may become useful by enabling the joint work of members of any group, and may be applied to various types of documents, e.g. in the case where A's original web-page W is a draft of a contract, which A negotiates with B and C, and the annotations are words or clauses to be added/deleted from the text.

The joint work of members A, B and C is not necessarily limited for real time or on-line situation. Alternatively, each member can create annotations at his convenience, save them on the SERVER Data Base, and update the other group members via the SERVER Message System.

The interactive, flexible nature of the collaboration method herein proposed is thus by far superior compared with the conventional way, where each party would have to enter his remarks and E-mail or fax the modified text in full to the other parties, for their review and response.

A preferred system for reducing the above concept into practice will now be described in conjunction with FIGS. 2–6.

Figure 2:
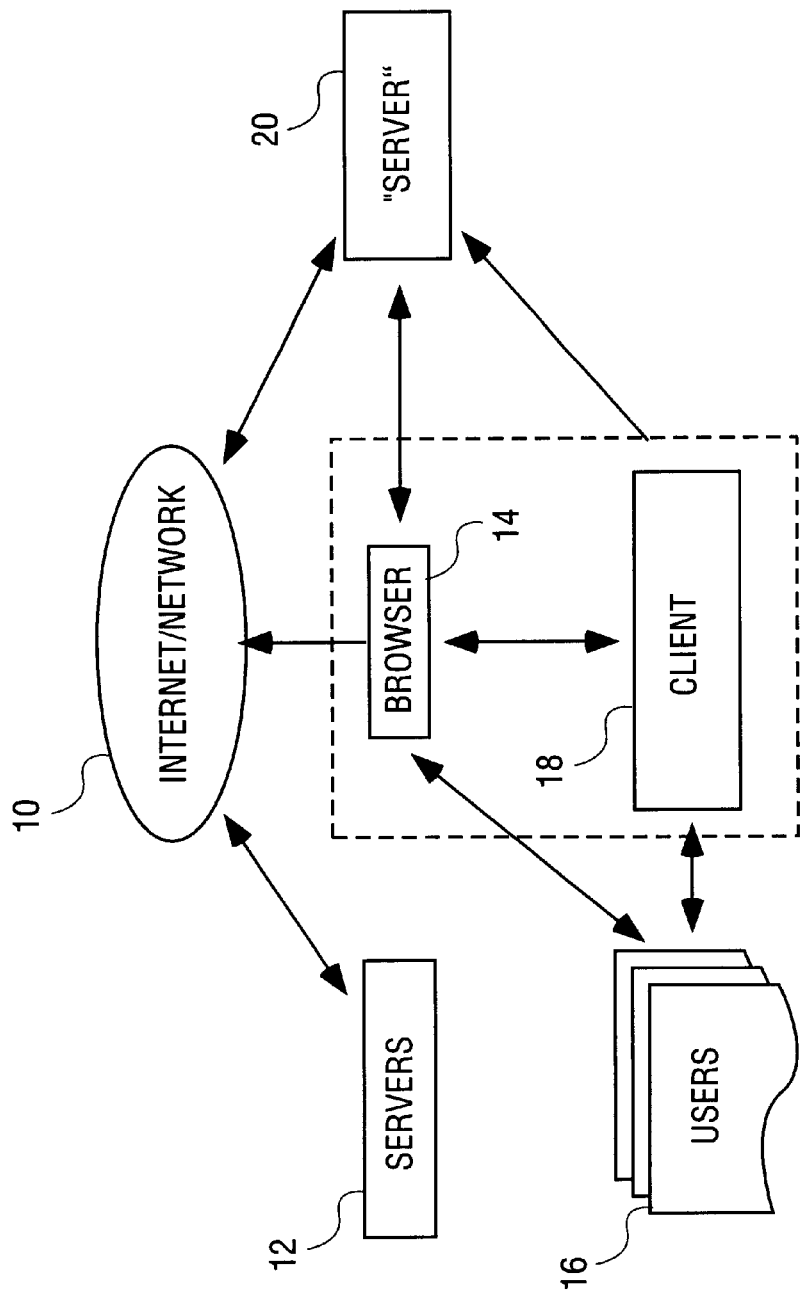
FIG. 2 illustrates a computer network in which the present invention is implemented.

As shown in FIG. 2, the Internet denoted 10 is a known computer network based on the client-server model. Conceptually, the Internet comprises a large network of "servers" 12 which are accessible to "users" 16. Users 16 are typically owners of personal computers, usually accessing the Internet 10 through private Internet access providers (not shown). Each of the users 16 may run a Browser 14, which is a known software tool used to access the servers 12 via the access providers.

The system as so far described is also being based on a client-server model. However, in a computer network in which the present invention is implemented, at the same time a user 16, who is a GROUP member, accesses a server 12 using the browser 14, a CLIENT application 18, which is accompanying the browser 14, automatically retrieves the overlaid annotations from SERVER 20.

In other words GROUP member users 16 are communicating with each other through the CLIENT 18, which is integrated with browser 14. Server 20 provides organization and synchronization between the GROUP members.

Figure 3:
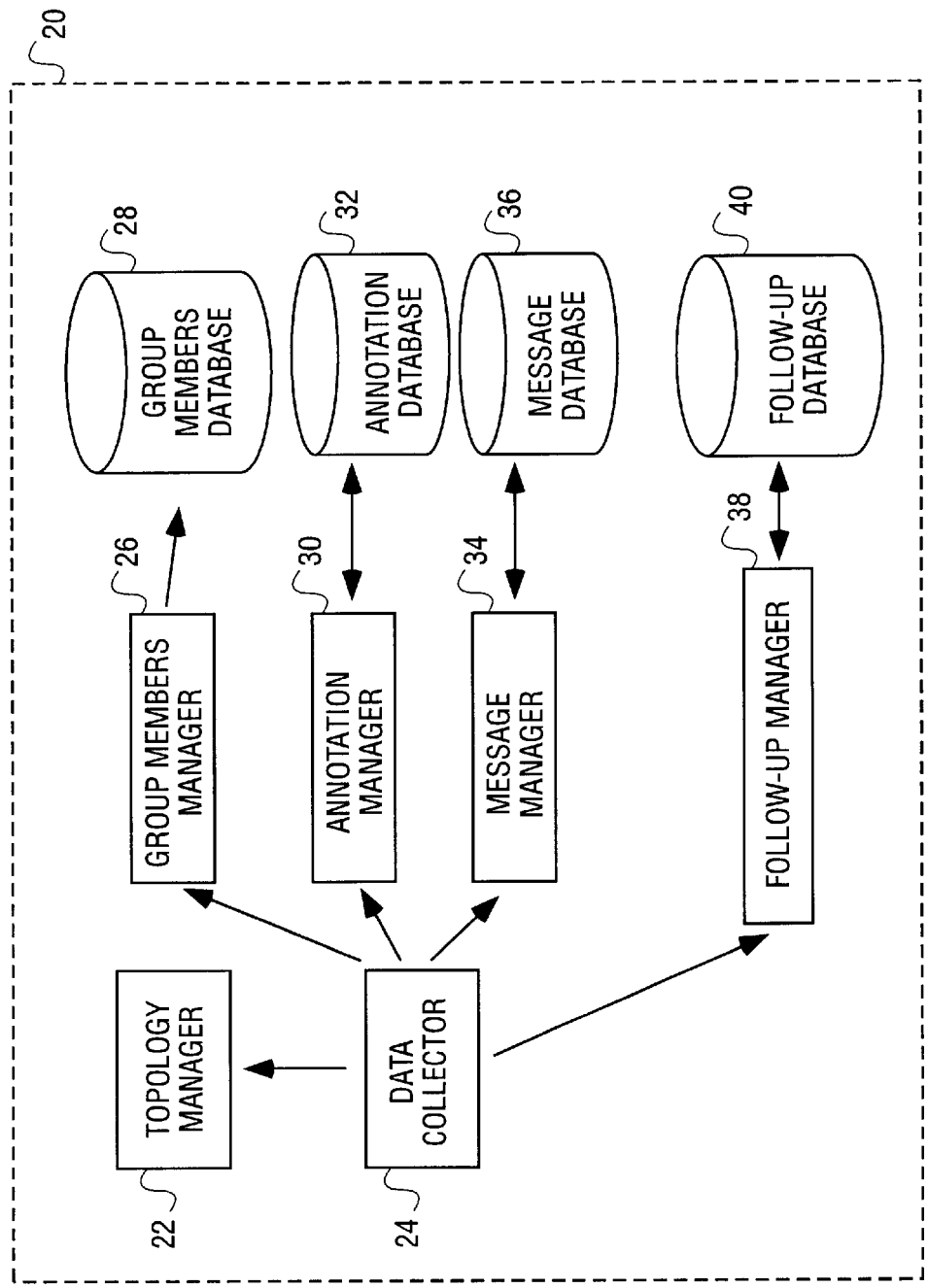
FIG. 3 is a schematic representation of a designated server application ("SERVER") of FIG. 2.

The main features of the SERVER 20 are represented in FIG. 3. Topology Manager 22, designed to enable the communication between the GROUP members, identifies on-line GROUP members, and classifies them into a pre-determined group affiliation. Topology Manager 22 also sends identifying information on existing GROUP members to newly joined GROUP members.

Data Collector 24 enables on-line connected GROUP members to send/receive information stored in the SERVER data-base(s) at any given time. The information is classified to the proper applications 26, 30, 34 or 38 (see below).

Group Members Manager 26 enables the creation of new GROUPs, and the updating of the system with new joining GROUP members and/or departure of such. This information is stored in Group Members Database 28.

Annotation Manager 30 enables GROUP members to access the Annotation Database 32 in order to load and/or save annotations relating to specific web pages. Each annotation is classified according to GROUP member's own identity, allowing access only to pre-determined GROUP affiliation.

Messages Manager 34 enables a GROUP member to store "shortcut" information intended for another GROUP member in the Messages Database 36.

In case the second GROUP member is connected on-line, he/she receives a signal (not shown) alerting him/her of incoming message. In case the second is GROUP member is not connected on-line, he/she will be informed of the awaiting message upon connecting to the SERVER 20.

Follow-up Manager 38 enables the receiving of all data concerning each GROUP member's activities while surfing the Internet and stores all relevant data in Follow-up Database 40.

Figure 4:
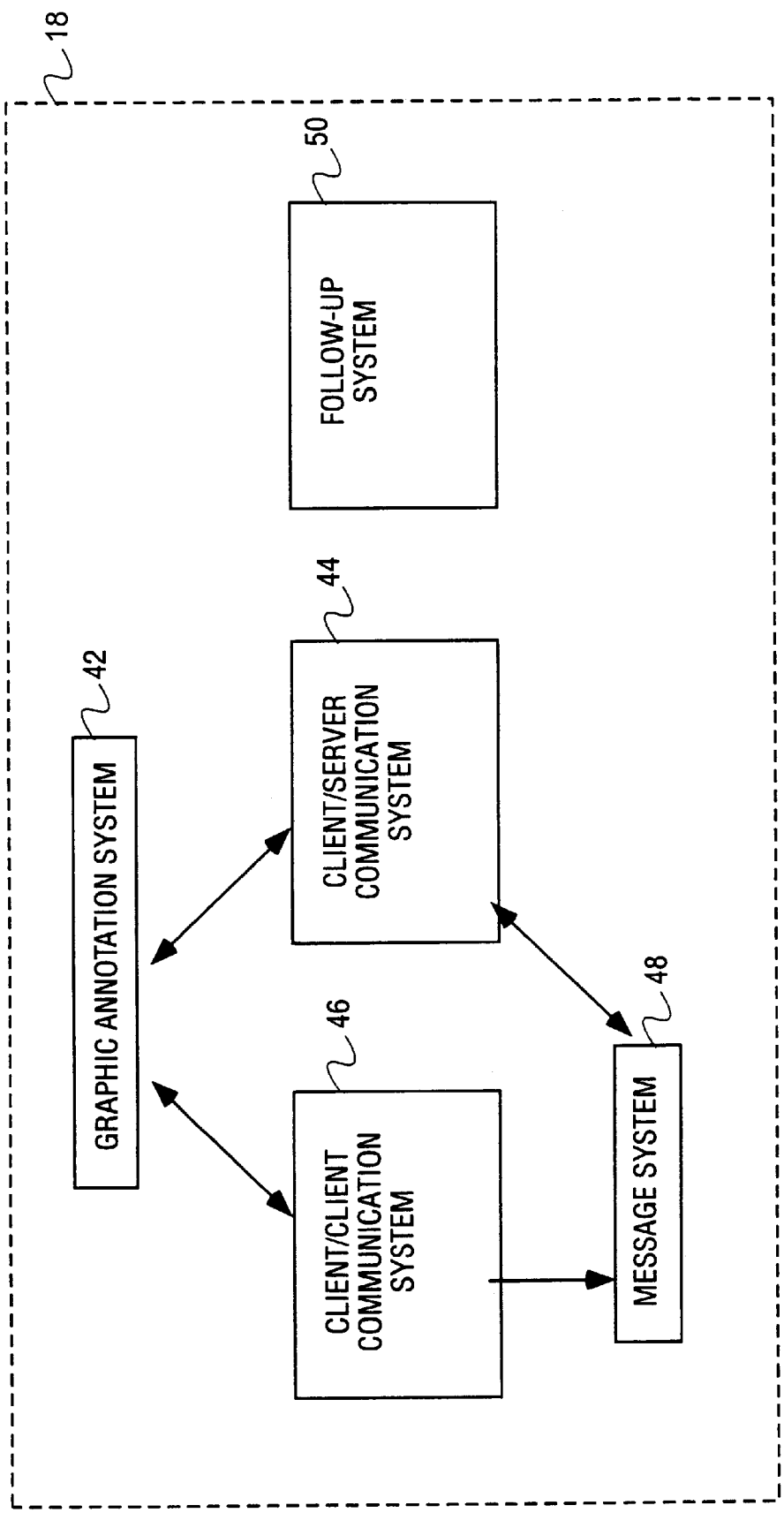
FIG. 4 is a schematic representation of a designated client application ("CLIENT") of FIG. 2.

The main features of the CLIENT application 18 are represented in FIG. 4. Graphic Annotation System 42 provides the GROUP member with graphic tools (e.g., a virtual pen), enabling the creation of graphical and textual annotations. The annotations can be placed anywhere over the original web-page and stored in the SERVER 20 with reference to the respective original web-page. Graphic Annotation System 42 also enables the viewing of overlaid annotations received from other GROUP members or from SERVER 20.

CLIENT/SERVER Communication System 44 enables the GROUP members to establish communication with the SERVER 20. Upon connecting, the GROUP member is updated regarding new associates currently connected to the server. Furthermore, GROUP members can access the SERVER 20.

CLIENT/CLIENT Communication System 46 enables the GROUP member to establish communication with other on-line GROUP members. On-line communication between GROUP members includes various utilities, such as one in which a GROUP member requests to be updated automatically with the web-page being viewed by a second member.

When GROUP members are synchronized to view the same web-page, as mentioned above, they can exchange data in real-time. The data may contain textual messages or graphical annotations as described above regarding Graphic Annotation System 42.

Message System 48 enables the GROUP member to transfer "shortcut" information to other GROUP member. The messages are addressed to a second GROUP member who is either on-line connected to the server or not (see above).

Follow-up System 50 collects the GROUP member's activities and sends them to be stored in the SERVER Follow-up DATABASE 40 (see above).

For example, if the GROUP member is viewing a vehicle company web-page and selects to view information on a specific car model, this selection is traced by Follow-up System 50 and transferred to the SERVER Follow-up Manager 38.

Figure 5:
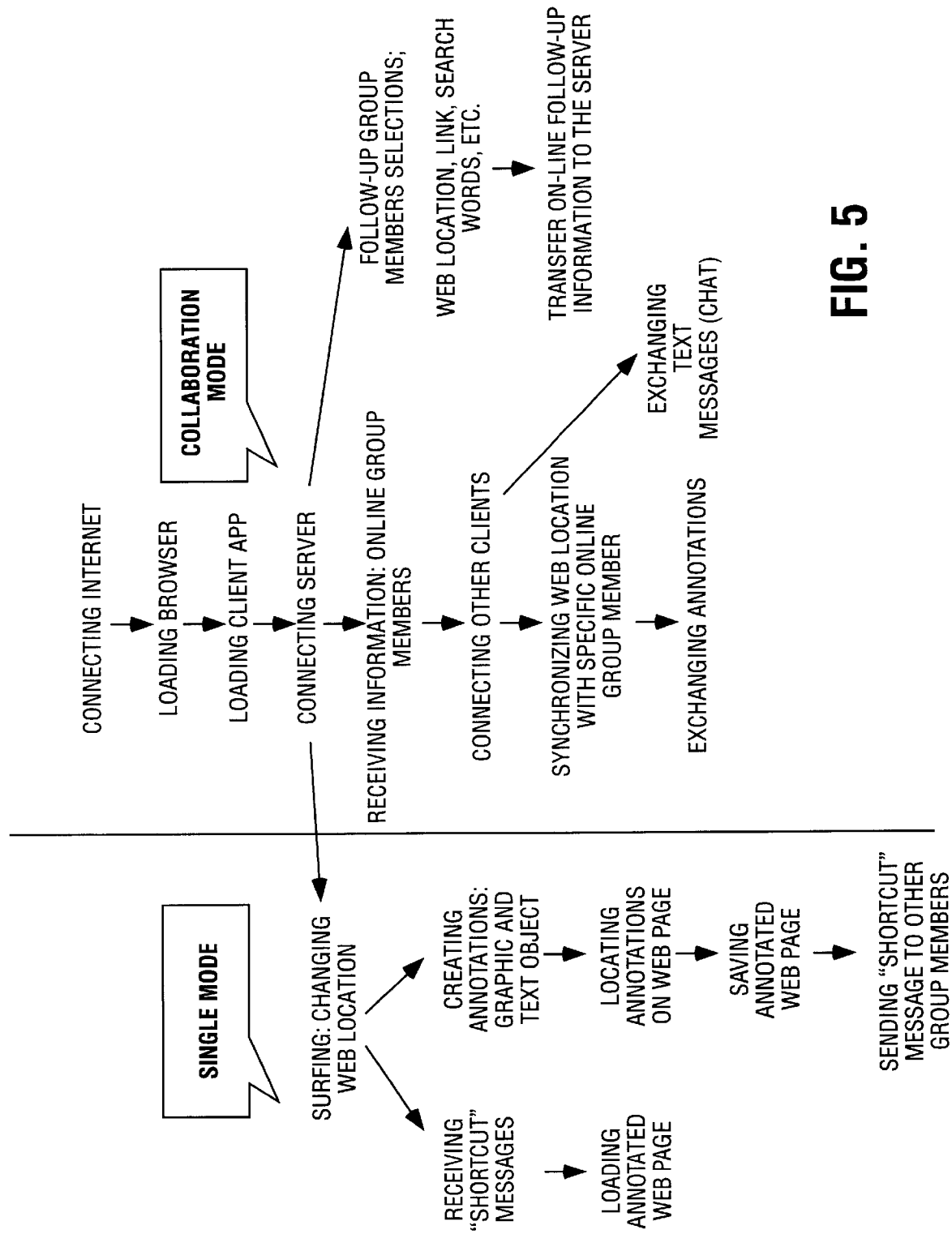
FIG. 5 is a general flow chart of the CLIENT application.

FIG. 5 represents a general flow-chart of the CLIENT 18 application.

Each GROUP member connected to the Internet 10 using the browser 14 can use the CLIENT application 18 in two modes:

Single mode: after connecting to the SERVER 20, the GROUP member can access the SERVER Annotation Database 32 and load stored annotations of his/her GROUP members. In addition, the GROUP member can create his/her own annotations, overlay them on any chosen web-page and have them saved. In order to share this information with one or more GROUP members, the first GROUP member can send a message containing a "shortcut" regarding the annotation to the SERVER.

Collaboration mode: This mode takes full advantage of the on-line mode disclosed herein: after connecting to the SERVER, the GROUP member is automatically informed of other on-line GROUP members and their current web-page. From this point on, the GROUP member can request to synchronize with a second GROUP member or more as described above. While being synchronized, the GROUP members view the same web-page and can exchange text and graphic annotations.

In both modes when a GROUP member is connected on-line to the SERVER, any act taken by the GROUP member while using the CLIENT is traced and transferred automatically to the SERVER Follow-up Database.

Various additional features apprehended bearing in mind that any modification or variation of the exemplified embodiment shall be deemed to be included within the scope of the invention and defined in and by the appended claims.

What is claimed is:

1. A computer-implemented method for coordinating annotations in real-time between a first client and a second client, the method comprising:

associating said first client with said second client to initiate a real-time annotation session;

automatically transmitting graphical annotation data generated by said first client to said second client in real-time, said graphical annotation data associated with an online document and describing a graphical annotation; and visually overlaying said graphical annotation on said online document at said second client, wherein said online document is not modified during overlaying of said graphical annotation.

2. The method of claim 1 wherein said online document is a Web page on the Internet.

3. The method of claim 1 wherein said graphical annotation data is transmitted directly from said first client to said second client over a client/client communication channel.

4. The method of claim 1 further comprising:

storing said graphical annotation data and said association with said online document in an annotation database.

5. The method as in claim 4 wherein said annotation database resides on a server to which said first and second clients are connected.

6. The method as in claim 1 wherein said graphical annotation data is transmitted from said first client to an annotation server over a client/server communication channel before being transmitted from said annotation server to said second client.

7. The method as in claim 1 further comprising:

automatically displaying a second online document on said second client in response to said first client displaying said second online document.

8. The method as in claim 7 further comprising:

automatically transmitting second graphical annotation data generated by said first client to said second client in real-time, said second graphical annotation data associated with said second online document and describing a second graphical annotation; and visually overlaying said second graphical annotation on top of said second online document at said second client, wherein said second online document is not modified during overlaying of said graphical annotation.

9. The method as in claim 8 further comprising:

storing said second graphical annotation data and said association with said second online document in an annotation database.

10. The method as in claim 1 further comprising:

automatically transmitting second graphical annotation data generated by said second client to said first client in real-time, said second graphical annotation data associated with said online document and describing a second graphical annotation; and visually overlaying said second graphical annotation on said online document at said first client, wherein said online document is not modified during overlaying of said second graphical annotation.

11. The method as in claim 1 further comprising:

associating a third client with said first client and said second client as part of said annotation session.

12. The method as in claim 11 further comprising:

automatically transmitting said graphical annotation data generated by said first client to said third client in real-time in response to said third client joining said annotation session; and visually overlaying said graphical annotation on top of said online document at said third client.

13. An article of manufacture including a sequence of instructions which, when executed by a computer of a first client, cause said computer to:

establish a real-time annotation session between said first client and a second client;

automatically transmit graphical annotation data generated by said first client to said second client in real-time, said graphical annotation data associated with an online document and describing a graphical annotation; and visually overlay said graphical annotation on said online document at said second client, wherein said online document is not modified during overlaying of said graphical annotation.

14. The article of manufacture of claim 13 wherein said online document is a Web page.

15. The article of manufacture of claim 13 wherein said graphical annotation data is transmitted directly from said first client to said second client over a client/client communication channel.

16. The article of manufacture as in claim 13 including additional instructions which, when executed by said computer, cause said computer to: store said graphical annotation data and said association with said online document in an annotation database.

17. The article of manufacture as in claim 16 wherein said annotation database resides on a server to which said first and second clients are connected.

18. The article of manufacture as in claim 13 including additional instructions which, when executed by said computer, cause said computer to:

automatically display a second online document on said second client in response to said first client displaying said second online document.

19. The article of manufacture as in claim 18 including additional instructions which, when executed by said computer, cause said computer to: automatically transmit second graphical annotation data generated by said first client to said second client in real-time, said second graphical annotation data associated with said second online document and describing a second graphical annotation; and visually overlay said second graphical annotation on top of said second online document at said second client, wherein said second online document is not modified during overlaying of said graphical annotation.

20. The article of manufacture as in claim 19 including additional instructions which, when executed by said computer, cause said computer to: store said second graphical annotation data and said association with said second online document in an annotation database.

21. The article of manufacture as in claim 13 including additional instructions which, when executed by said computer, cause said computer to:

automatically transmit second graphical annotation data generated by said second client to said first client in real-time, said second graphical annotation data associated with said online document and describing a second graphical annotation; and visually overlay said second graphical annotation on top of said online document at said first client, wherein said online document is not modified during overlaying of said second graphical. annotation.

22. The article of manufacture as in claim 13 including additional instructions which, when executed by said computer, cause said computer to:
add a third client to said annotation session between said first client and a second client.

23. The article of manufacture as in claim 13 including additional instructions which, when executed by said computer, cause said computer to: automatically transmit said graphical annotation data generated by said first client to said third client in real-time in response to said third client joining said annotation session; and
visually overlay said graphical annotation on top of said online document at said third client.

24. An annotation system comprised of:
a topology manager for coordinating a real-time group annotation session between two or more clients belonging to the same annotation group;
wherein annotations generated by a first client and associated with an online document are transmitted to other clients in said annotation group in real-time,
wherein said annotations generated by said first client are visually overlayed on top of said online document at said other clients in said annotation group, and
wherein said online document is not modified during overlaying of said annotation.

25. The system as in claim 24 further comprising:
an annotation manager for storing annotation data defining said annotations in an annotation database wherein said annotations are associated with said annotation group.

26. The system as in claim 24 further comprising:
a client/client communication interface residing on each of said clients in said annotation group and configured to transmit annotations made by any client in said group directly to other clients in said group.

27. The system as in claim 25 further comprising:
a client/server communication interface residing on each of said clients in said annotation group and configured to transmit annotations made by any client in said group directly to said annotation manager.

28. The system as in claim 24 further comprising:
a message system for automatically transmitting shortcut information from one group member to another group member.

29. The system as in claim 28 wherein said shortcut information is a Uniform Resource Locator ("URL") for a Web page.

30. The system as in claim 24 further comprising:
a follow-up manager for tracking and storing each group member's activities while each group member is involved in said annotation session.

31. The system as in claim 30 wherein one of said activities is viewing different Web pages from the Internet.

32. The system as in claim 24 further comprising:
a group members manager for storing a plurality of annotation group data in a database including a client list for each annotation group.

33. A computer-implemented method for coordinating annotations between a first client and a second client, the method comprising:
associating said first client with said second client to initiate real-time annotation session;
automatically transmitting graphical annotation data generated by said first client to said second client in real-time, said graphical annotation data associated with a specified area of said online document and describing a graphical annotation; and
visually overlaying said graphical annotation on said online document at said second client,
wherein said graphical annotation visually occupies substantially the same spatial relationship with said specified area of said online document at both said first client and said second client.

34. The method of claim 33 wherein said online document is a Web page on the Internet.

35. The method of claim 33 wherein said graphical annotation data is transmitted directly from said first client to said second client over a client/client communication channel.

36. The method of claim 33 further comprising:
storing said graphical annotation data and said association with said online document in an annotation database.

37. The method as in claim 36 wherein said annotation database resides on a server to which said first and second clients are connected.

38. The method as in claim 33 wherein said graphical annotation data is transmitted from said first client to an annotation server over a client/server
communication channel before being transmitted from said annotation server to said second client.

39. The method as in claim 33 further comprising:
automatically displaying a second online document on said second client in response to said first client displaying said second online document.

40. The method as in claim 39 further comprising:
automatically transmitting second graphical annotation data generated by said first client to said second client in real-time, said second graphical annotation data associated with a specified area of said second online document and describing a second graphical annotation; and
visually overlaying said second graphical annotation on top of said second online document at said second client,
wherein said second graphical annotation visually occupies substantially the same spatial relationship with said specified area of said second online document at both said first client and said second client.

41. The method as in claim 40 further comprising:
storing said second graphical annotation data and said association with said second online document in an annotation database.

42. The method as in claim 33 further comprising:
automatically transmitting second graphical annotation data generated by said second client to said first client in real-time, said second graphical annotation data associated with a second area of said online document and describing a second graphical annotation; and
visually overlaying said second graphical annotation on said online document at said first client,
wherein said second graphical annotation visually occupies substantially the same spatial relationship with said second area of said online document at both said first client and said second client.

43. The method as in claim 33 further comprising:
associating a third client with said first client and said second client as part of said annotation session.

44. The method as in claim 43 further comprising:
automatically transmitting said graphical annotation data generated by said first client to said third client in real-time in response to said third client joining said annotation session; and
visually overlaying said graphical annotation on top of said online document at said third client, wherein said graphical annotation visually occupies substantially the same spatial relationship with said specified area of said online document at said third client as with both said first client and said second client.

45. The method as in claim 33 further comprising:

saving said graphical annotation data in an annotation database wherein said graphical annotation data is associated with said online document.

46. The method as in claim 45 wherein said annotation database is on a server to which said first client and said second client communicate.

47. The method as in claim 45 further comprising:

said first client loading said graphical annotation data from said annotation database.

48. The method as in claim 45 further comprising:

said second client loading said graphical annotation data from said annotation database.

49. The method as in claim 47 further comprising:

loading said online document on said first client and overlaying said graphical annotation on said online document.

50. The method as in claim 48 further comprising:

loading said online document on said second client and overlaying said graphical annotation on said online document.

* * * * *